Patented Nov. 2, 1937

2,098,097

UNITED STATES PATENT OFFICE 2,098,097

CONDENSATION PRODUCTS OF 1,2,3,4-BUTYLENE-DIOXIDES AND A PROCESS OF MAKING SAME

Heinrich Hopff and August Weickmann, Ludwigshafen-on-the-Rhine, Germany, assignors to General Aniline Works, Inc., New York, N. Y., a corporation of Delaware No Drawing. Application December 18, 1935, Serial No. 55,041. In Germany December 20, 1934

13 Claims. (Cl. 260—60)

The present invention relates to the manufacture and production of condensation products.

We have found that industrially valuable condensation products can be obtained by condensing butylene-1,2,3,4-dioxides with aromatic or heterocyclic compounds which are free from sulphonic acid groups but which contain reactive hydrogen atoms. Some of the condensation products obtainable according to our invention are coloured and are especially suitable for dyeing cellulose esters and ethers.

As butylene dioxides suitable for the purposes of this invention may be mentioned for example butylene-1,2,3,4-dioxide and its homologues. Butylene-1,2,3,4-dioxide is obtainable by splitting off hydrogen chloride from 1,4-dichlor-2,3-dihydroxybutane. It exists in two modifications, namely the cis-form and the trans-form:

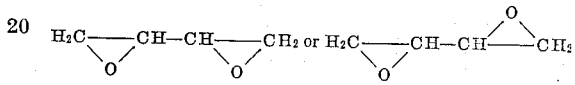

They are equally suitable for the reaction according to this invention. Homologues of butylene-1,2,3,4-dioxide may also be employed with advantage; these may be obtained in an analogous manner from the dichlordihydroxy compounds obtainable from isoprene, piperylene, dimethylbutadiene and the like.

As aromatic or heterocyclic compounds containing reactive hydrogen atoms may be mentioned for example aromatic or heterocyclic compounds containing amino and/or hydroxyl groups, as for example aromatic mono- and polynuclear amines, such as aniline, methylaniline, naphthylamines, phenols, naphthols, amino-pyrazolones, amino-pyridines, oxy-quinolines, aminoazo compounds and aminoanthraquinones.

When the said compounds are coloured they yield by condensation with the butylene dioxides, coloured condensation products which are difficultly soluble in water and which dye acetate artificial silk, for example, directly from aqueous suspensions.

The said products may also be employed for dyeing cellulose esters or ethers or lacquers prepared therefrom; for example they may be rolled into solid cellulose ethers or esters, preferably after the addition of softening agents. Colourless condensation products of the said kind are valuable intermediates in the manufacture of dyestuffs.

Coloured condensation products are obtained for example by condensing 2 molecular proportions of aminoazobenzene with 1 molecular proportion of butylene-1,2,3,4-dioxide, a reaction product being obtained which, contrasted with aminoazobenzene itself, dissolves in dilute hydrochloric acid giving a violet red colouration and yields a very fast lemon yellow shade on acetate artificial silk from aqueous suspension. A condensation product which dyes acetate artificial silk orange shades is obtained in a similar manner from 2 molecular proportions of alpha-aminoanthraquinone and 1 molecular proportion of butylene-1,2,3,4-dioxide.

If, on the other hand, 1 molecular proportion of butylene-1,2,3,4-dioxide be condensed with 2 molecular proportions of a non-coloured aromatic amine, as for example aniline or meta-toluidine, colourless condensation products are obtained.

The reaction proceeds in general in a very smooth manner. If simple amines, such as aniline, toluidines, or naphthylamines are used as starting materials, it is only necessary to gently warm the reaction mixture until reaction commences which then proceeds with evolution of heat. If amino-anthraquinones or aromatic and heterocyclic hydroxy compounds are employed as starting materials it is preferable to heat the reaction mixture until reaction is completed, if desired in a closed vessel. In some cases, catalysts may be employed. As suitable catalysts may be mentioned for example sodium hydroxide and potassium hydroxide. If desired organic solvents or diluents may be added to the reaction mixture.

The following examples will further illustrate how the said invention may be carried out in practice but the invention is not restricted to these examples. The parts are by weight.

Example 1

186 parts of aniline are mixed with 86 parts of butylene-1,2,3,4-dioxide and the mixture is gently warmed until reaction commences. Condensation takes place with strong evolution of heat to form 1,4-dianilido-2,3-butanediol, which is a resinous product. The condensation is completed in a few minutes.

Other amines, such as the toluidines, xylidines, aminophenols, aminonaphthols or aminopyridines, may be employed instead of aniline.

Example 2

394 parts of para-aminoazobenzene are heated with 86 parts of butylene-1,2,3,4-dioxide. The condensation, which proceeds with a violent reaction, is completed in a few minutes. The dark brown condensation product is dissolved in acetone and then poured into water. A fine suspension is obtained with which acetate artificial silk is dyed very powerful lemon yellow shades.

A similarly coloured product is obtained by employing para-aminoazotoluene instead of para-aminoazobenzene.

*Example 3*

446 parts of alpha-aminoanthraquinone are heated with 86 parts of butylene-1,2,3,4-dioxide in a closed vessel for ten hours at from 150° to 160° C. The condensation product obtained yields a beautiful orange shade on acetate artificial silk when dyed from a dispersion soap bath.

*Example 4*

188 parts of phenol are heated with 86 parts of butylene-1,2,3,4-dioxide under reflux for 3 hours while adding a small amount of solid potassium hydroxide. The distillation of the condensation product obtained in vacuo yields a yellowish tough viscous oil boiling within the range of from about 130° to about 160° C. at 10 millimeters (mercury gauge). The oil mainly consists of 1,4-diphenoxy-butane-2,3-diol.

If 290 parts of 8-hydroxy-quinoline are employed instead of phenol, 1,4-di-(quinolinyl-8-hydroxy)-butane-2,3-diol is formed in a good yield. If 290 parts of 8-amino-quinoline are condensed with 86 parts of butylene-1,2,3,4-dioxide under the same reaction conditions, 1,4-di-(quinolinyl-8-amino)-butane-2,3-diol is formed in a good yield.

What we claim is:

1. The process for the production of condensation products which consists in reacting butylene 1,2,3,4-dioxides with organic compounds containing at least one reactive hydrogen atom selected from the group consisting of aromatic and N-heterocyclic compounds containing a substituent of the group consisting of the amino and hydroxy group which compounds are free from sulphonic acid groups.

2. The process for the production of condensation products which consists in reacting 1 molecular proportion of a butylene-1,2,3,4-dioxide with 2 molecular proportions of an organic compound containing at least one reactive hydrogen atom selected from the group consisting of aromatic and N-heterocyclic compounds containing a substituent of the group consisting of the amino and hydroxy group which compounds are free from sulphonic acid groups.

3. The process for the production of condensation products which consists in reacting 1 molecular proportion of a butylene-1,2,3,4-dioxide with 2 molecular proportions of an aromatic compound containing a substituent selected from the group consisting of the amino and hydroxy group and containing at least one reactive hydrogen atom which compound is free from sulphonic acid groups.

4. The process for the production of condensation products which consists in reacting 1 molecular proportion of a butylene-1,2,3,4-dioxide with 2 molecular proportions of an aromatic amine containing at least one reactive hydrogen atom which amine is free from sulphonic acid groups.

5. The process for the production of condensation products which consists in reacting 1 molecular proportion of a butylene-1,2,3,4-dioxide with 2 molecular proportions of aniline.

6. The process for the production of condensation products which consists in reacting 1 molecular proportion of butylene-1,2,3,4-dioxide with 2 molecular proportions of aniline.

7. The process for the production of condensation products which consists in reacting 1 molecular proportion of a butylene-1,2,3,4-dioxide with 2 molecular proportions of aminoazobenzene.

8. The process for the production of condensation products which consists in reacting 1 molecular proportion of a butylene-1,2,3,4-dioxide with 2 molecular proportions of an amino anthraquinone.

9. The process for the production of condensation products which consists in reacting 1 molecular proportion of butylene-1,2,3,4-dioxide with 2 molecular proportions of alpha-amino anthraquinone.

10. Condensation products of butylene-1,2,3,4-dioxides with organic compounds containing at least one reactive hydrogen atom selected from the group consisting of aromatic and N-heterocyclic compounds containing a substituent of the group consisting of the amino and hydroxy group which compounds are free from sulphonic acid groups.

11. Condensation products of butylene-1,2,3,4-dioxides with aromatic amines which are free from sulphonic acid groups.

12. The condensation product of 1 molecular proportion of butylene-1,2,3,4-dioxide with 2 molecular proportions of aniline.

13. The condensation product of 1 molecular proportion of butylene-1,2,3,4-dioxide with 2 molecular proportions of alpha-amino anthraquinone.

HEINRICH HOPFF.
AUGUST WEICKMANN.